Aug. 28, 1962 G. ALFIERI 3,051,016
AIR COMPRESSORS FOR PRESSURE AIR PLANTS, PARTICULARLY FOR VEHICLES
Filed July 7, 1959
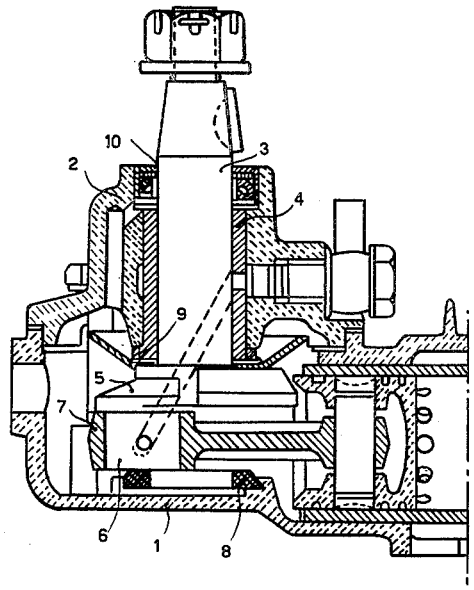
INVENTOR.
GIUSEPPE ALFIERI
BY
ATTORNEYS

United States Patent Office 3,051,016
Patented Aug. 28, 1962

3,051,016
AIR COMPRESSORS FOR PRESSURE AIR PLANTS, PARTICULARLY FOR VEHICLES
Giuseppe Alfieri, Milan, Italy, assignor to Fabbrica Italiana Magneti Marelli S.p.A., Milan, Italy, a firm
Filed July 7, 1959, Ser. No. 825,596
Claims priority, application Italy July 9, 1958
2 Claims. (Cl. 74—595)

The invention refers to an improvement in reciprocating machines, particularly air compressors for pressure air plants with cantilever driving shaft. It is known that in the conventional type of air compressor, the driving shaft can freely rotate whereas the axial motion thereof is prevented by unitable stop rings that are side arranged.

It is also known that in the coupling between the crankshaft and connecting rod, the connecting rod is threadably fastened to the crankshaft and rotatably retained at the distal end of the crankshaft by a shoulder ring that prevents the connecting rod coupling from unthreading.

According to the invention the improvement consists in providing on the compressor body in the region of the free end of the crankshaft a contact surface which besides preventing the shaft from an axial inwards motion, forms at the same time an abutment for the connecting rod which is rotatably connected to the free end of the crankshaft preventing uncoupling therebetween and axial outwards motion of the shaft is avoided by a shoulder provided at the inside end of the shaft bearing.

The attached drawing illustrates a section of an air compressor embodying the concepts of the invention.

Referring to the drawing, 1 indicates the compressor body and 2 the side closure cover, wherein the cylindrical bearing opening is provided. A bearing 4 is disposed within the bearing receiving opening and is adapted to journal the driving shaft 3.

The driving shaft 3 extends into the compressor body 1 and is provided with a cantilever arm or crankshaft 5 terminating in an extension 6. One end of a connecting rod 7 is rotatably positioned on the terminal portion 6 of the crankshaft 5.

In the inner surface of the compressor body 1 is provided with a bearing surface 8 which prevents the shaft 3 from inward axial motion and avoids uncoupling of connecting rod 7 and the crankshaft extension 6. The bearing surface 8 constitutes an abutment as a bearing surface for the connecting rod and is preferably formed of a suitable bearing material in the shape of an annulus having flat side surfaces. The bearing surface element 8 may be inserted in the inner surface of the compressor body 1 by the conventional press fitting procedures; or alternatively may be directly machined from the material of the body 8. In this latter case a suitable smoothing or lapping of the inner surface would be required. And, in certain instances the bearing surface 8 would be exposed to a hardening treatment, if the material of the body 1 were not sufficiently wearproof.

The bearing 4 is provided with a shoulder 9, which engages a shoulder of arm 5 to prevent the shaft 3 from an outward motion.

The invention described hereinabove provides simple and quick fitting of the parts, as the connecting rod is free fitted to the extended end of the crankshaft and the entire unit can be completely assembled by means of a simple fastening of the machine housing.

A further and advantageous feature of the invention consists in the elimination of the shoulder rings that in the case under consideration would be arranged on the outside 10 of the shaft 3 as well as on the crankshaft extension 6 to retain the connecting rod 7. Present improvement is advantageous, as the necessity of forming recesses on the rotating members is avoided.

This greater construction simplicity allows a better use of the driving shafts, as the weakening that depends on thickness diminution and consequent sharp section alteration is removed.

I claim:
1. An air compressor assembly for pressure air plants including in combination, an air compressor housing, a driving shaft arranged in the side of said housing, a cantilever crank pin on the end of said driving shaft within said housing, a connecting rod rotatably connected to said crank pin, a flat contact surface on the inner surface of said housing in contact with the end of said crank pin and the end of said connecting rod connected to said crank pin, said contact surface preventing axial movement of said driving shaft and lateral movement of said connecting rod in one direction, a shoulder carried by said housing, and a shoulder on said driving shaft in contact with said first mentioned shoulder preventing axial movement of said driving shaft and lateral movement of said connecting rod in the other direction.

2. The invention claimed in claim 1, wherein said contact surface is in the form of an annulus of bearing material.

References Cited in the file of this patent
UNITED STATES PATENTS

| | | |
|---|---|---|
| 1,107,687 | Merralls | Aug. 18, 1914 |
| 1,300,217 | Kilgore | Apr. 8, 1919 |
| 1,846,656 | Rayfield | Feb. 23, 1932 |
| 2,324,291 | Dodge | July 13, 1943 |
| 2,680,428 | Tatar | June 8, 1954 |

FOREIGN PATENTS

| | | |
|---|---|---|
| 916,809 | Germany | Aug. 19, 1954 |